Stewart B. McClelland, Joseph W. Light, INVENTORS
Noel H. Moon, Russell Fowler

BY
ATTORNEY

Stewart B. McClelland, Joseph W. Light, INVENTORS
Noel H. Moon, Russell Fowler

BY

ATTORNEY 3,117,443
CONSTRAIN HOLDER FOR ELASTOMERIC
TEST SPECIMENS
Stewart B. McClelland, Huntsville, Joseph W. Light, Lacey Springs, and Noel H. Moon and Russell Fowler, Huntsville, Ala., assignors to Thiokol Chemical Corporation, Bristol, Pa., a corporation of Delaware
Filed June 22, 1962, Ser. No. 204,520
6 Claims. (Cl. 73—103)

This invention relates to improvement in appliances for holding elastomeric test specimens under constant strain during test periods of predetermined duration.

In the production of elastomeric solid propellant rocket grains, it is desirable to place test specimens of the propellant used under constant strain and to subject such test specimens, while under constant strain to various conditions of temperature, humidity, etc. for varying periods of time.

To properly test a specimen under constant strain, it has been found that each specimen should be tested individually. This is deemed advisable because of the type of material that is being tested. In other words, each test specimen has its own individual characteristics; and to subject more than one test specimen at a time to the same constant strain in the same constrain holder will not provide accurate data for any of the individual test specimens being tested.

It is also a requirement that instant release of the test specimen be achieved after the test period has been terminated.

The constant strain test is necessary because, at various conditions of temperature, humidity, etc., constant strain is applied to a test specimen because of contraction and expansion that is caused by the conditions which will exist in a finished solid propellant rocket motor under operational environment. Since efficient operation of a solid propellant rocket motor requires a solid propellant grain that will not crack or split under adverse conditions, it has been found necessary to pre-test the propellant used in the grain to determine if the desired result will be obtained with the specific batch being tested.

An object of this invention is to provide a constrain holder that will permit a fixed strain to be applied to a test specimen and is also susceptible of being stored in an economical space-saving manner.

The constrain holder will, therefore, perform a dual function; it will permit a fixed strain to be imposed and retained on a test specimen of a solid propellant grain and will also permit storage of the constrain holder in a storage space of fixed dimensions in an economical space-saving arrangement.

Previously designed holders were bulky, time-consuming in operation, expensive to manufacture, and were of a configuration that prevented efficient and economical storage.

The constrain holder, to be efficient, must be capable of providing an axial strain that does not deviate from a straight line, for if the axial strain did not coincide with the true axis of the test specimen before the strain was applied, the test would not be conclusive.

Another object of the invention is, therefore, to provide a constrain holder that will permit a constant, fixed linear strain, without torque, to be applied to a test specimen.

The constrain holder, therefore, of the present invention is simple in construction, easy to manipulate, yet is of the highest efficiency in operation.

With the above and other objects and advantages in view, the invention consists of the novel details of construction, arrangement, and combination of parts more fully hereinafter described, claimed, and illustrated in the accompanying drawings in which:

Figure 1:
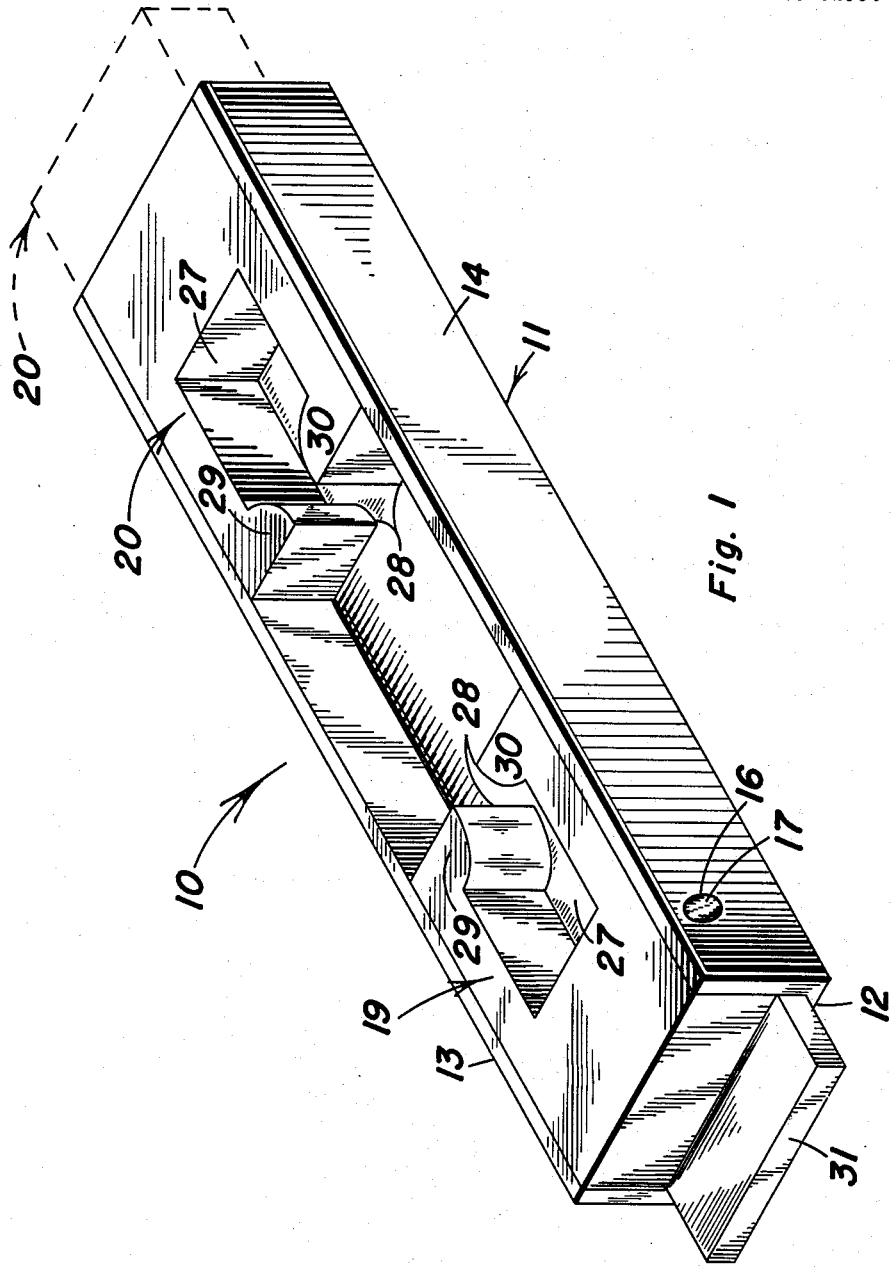
FIGURE 1 is a perspective view of a constrain holder embodying the invention.

Referring more in detail to the drawings wherein like parts are designated by like reference numerals, the reference numeral 10 is used to designate a constrain holder embodying the invention.

The constrain holder 10 comprises in part a channel shaped body member 11 that includes a base 12 and vertically disposed walls 13 and 14 that are integral with and retained in fixed spaced parallel relation to each other by means of the base 12.

Adjacent to one end of the body member 11, aligned openings 15 and 16 are positioned in the walls 13 and 14. A pin 17 extends transversely of the body member 11 with the outermost ends thereof terminating in the walls 13 and 14 and thus provide a smooth unbroken outer surface. The flush surface permits contact with a similar constrain holder when several are stored during pre-determined test periods.

The wall 13 has mounted therein at the end thereof removed from the end having the opening 15 therein, a recessed head set screw 18 which may be manipulated to extend into or be retracted from that space that exists intermediate of the walls 13 and 14 of the body member 11.

The constrain holder 10 also comprises a pair of jaw members 19 and 20 that are of similar configuration and are of a size transversely thereof to loosely fit within the space intermediate of the walls 13 and 14. Jaw member 19 is prevented from longitudinal movement within the channel shaped body member 11 by having therein a transverse passage 21 through which the pin 17 will extend. The jaw member 19 cannot, therefore, move longitudinally of the channel shaped body member 11 but can pivot on the pin 17 when desirable. Jaw member 20 may slide reciprocately in the space intermediate of the walls 13 and 14 of the channel shaped body member 11 longitudinally thereof, but can be retained in fixed relation to the channel shaped body member 11 by the engagement of the recessed head set screw 18 in the wall 13 with the outer surface of the side of the jaw member 20.

The test specimen 22 is of the "dog-bone type" and is of substantially the same configuration as a "JANAF" test specimen, which is well known in the art. Test specimen 22 has enlarged head end portions 23 and 24 that are joined in parallel spaced aligned relation to each other by an elongated reduced web portion 25. At the four inner corners of the head end portions 23 and 24 where they merge into the web portion 25, there are formed concave shoulders 26, and the shoulders 26 outline the terminal ends of the reduced web portion 25.

In order that the jaw members 19 and 20 may conform to and retain the test specimen 22 under strain, each of the jaw members 19 and 20 is provided with a socket 27 to receive the head end portions 23 and 24 of the test specimen 22. Communicating with each of the sockets 27 are throat portions 28 which merge into convex projections 29 and 30. The convex projections 29 and 30 are adapted to conform with the concave shoulders 26 of the test specimen 22. It is the engagement of the concave shoulders 26 of the test specimen 22 with the convex projections 29 and 30 of the jaws 19 and 20 that retain the test specimen 22 under strain during the testing and storage thereof.

Figure 2:
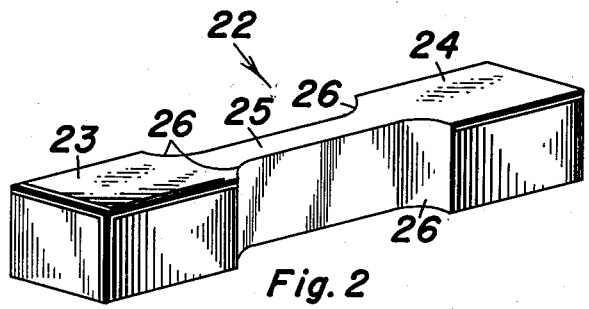
FIGURE 2 is a perspective view of a test specimen that is substantially the same configuration as a "JANAF" test specimen.
Figure 3:
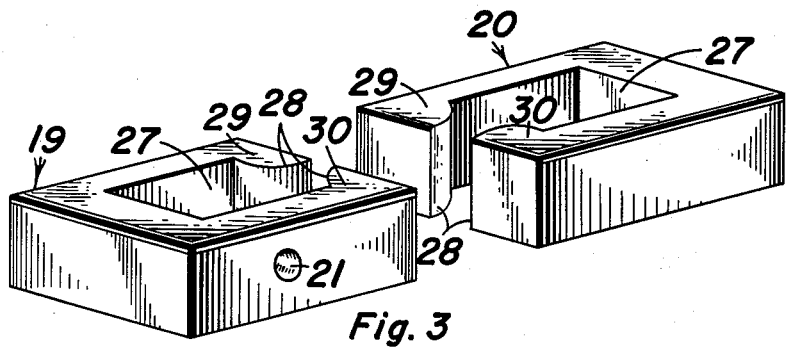
FIGURE 3 is a perspective view of the fixed and movable jaws of the constrain holder of FIGURE 1.
Figure 4:
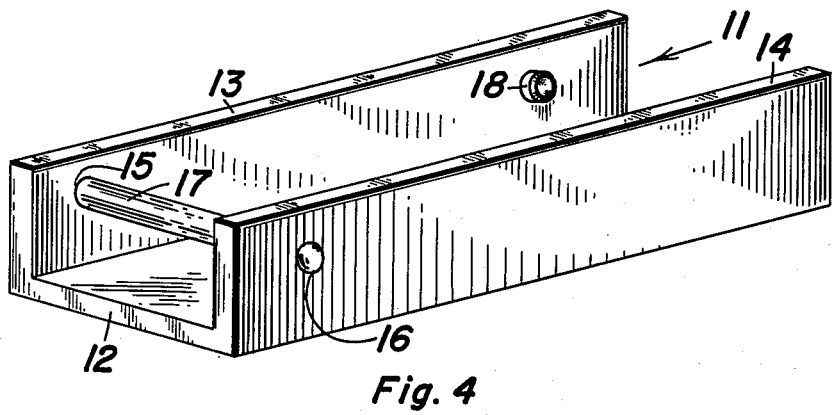
FIGURE 4 is a perspective view of the body member of the constrain holder of FIGURE 1.

When a constrain test is to be made on a test specimen such as shown in FIGURE 2, an alignment and spacing plate 31, FIGURE 1, is slid under jaw member 19 and lies on the surface of the base 12 of the body member 11. The plate 31 is of a thickness to support the jaw members 19 and 20 in the same plane, with the upper surface of each jaw member flush with the upper longitudinal edges of the walls 13 and 14 of the body member 11.

With the jaw members 19 and 20 in contact with the plate 31 they are in axial alignment with each other, by reason of the formation of the body member 11, so that when the test specimen 22 is placed in the constrain holder 10 the head ends 23 and 24 are seated in the sockets 27 of the jaw members 19 and 20 and the convex projections 29 and 30 are seated in the concave shoulders 26 of the test specimen 22, the test specimen 22 is then ready to be subjected to test.

As previously stated, the function of the constrain holder 10 is to hold a "JANAF" test specimen of solid propellant in constant strain after the strain has been imposed thereon.

The test specimens 22 are pre-cut and are placed in the constrain holder 10 as previously described at zero strain. Then by means of placing the end of a finger of the operator's hand on the jaw member 20 and sliding the jaw member 20 away from the jaw member 19, the test specimen 22 is elongated longitudinally the desired amount, i.e. the elongation desired for the particular test to which the test specimen is to be subjected. The elongation is measured with the aid of a gauge of predetermined dimensions, which is placed on the web 25, intermediate of and in contact with the inner ends of the jaw members 19 and 20. When the elongation of the test specimen has been accurately determined, or the desired strain has been imposed, the recessed head set screw 18 is manipulated to force it into engagement with the side of the jaw member 20 to retain the jaw member 20 in fixed relation to the channel shaped body member 11.

Since it is highly desirable for air to circulate freely about the test specimen 22 during the storage and test conditioning thereof, the plate 31 is removed so that the air can be circulated below as well as above the test specimen.

The constrain holder 10 with the test specimen therein is now ready for test conditioning and storage. The constrain holder 10 is of a size and configuration such that when there are a plurality of constrain holders 10 to be stored, the storage area can readily be made of a size to receive the constrain holders 10 without any lost space.

The constrain holder 10 may be made of a lasting material, or it may be made of a disposable material having sufficient strength to withstand the tension applied to the test specimen 22. Thus the constrain holder 10 is, therefore, a very economical appliance for carrying out the desired tests.

It is believed, therefore, that the foregoing description when taken in conjunction with the accompanying drawings will clearly illustrate the manner of construction and use of the invention; and it is to be understood by those skilled in the art that minor changes in the details of construction, arrangement, and combination of parts may be resorted to provided they fall within the spirit of the invention and the scope of the appended claims.

Having thus described the invention, what is claimed as new and desired to be secured by Letters Patent is:

1. A constrain holder for elastomeric test specimens comprising a body member of channel formation including a base and a pair of vertically-disposed, parallel side walls integral with said base, fixed and movable jaw members in said body member, said jaw members having incorporated therein socket means for holding therebetween an elastomeric specimen to be tested, a fixed pin extending transversely of said body member in spaced parallel relation to said base with the opposite ends thereof terminating in said side walls, said fixed jaw member having a passage therein for receiving said pin whereby said fixed jaw member is maintained immobile with relation to said body member and one of said walls is provided with a set screw that will engage said movable jaw member to retain said movable jaw member in fixed relation to said body member during the testing of said elastomeric specimen.

2. A constrain holder for holding an elastomeric test specimen, as in claim 1, wherein the socket means in said fixed and movable jaw members for holding said specimen is of the same configuration as said test specimen.

3. A constrain holder for holding an elastomeric test specimen comprising a body member of channel formation, a fixed jaw and a movable jaw mounted in said body member so that the configuration of said body member prevents lateral displacement of said fixed jaw and said movable jaw, a set screw mounted in said body member to engage said movable jaw to retain said movable jaw in adjusted relation to said fixed jaw and said fixed and movable jaws each having a socket therein conforming to the shape of said test specimen.

4. The combination of a constrain holder and an elastomeric test specimen of "dog-bone configuration," comprising a U-shaped body member so that the configuration of said body member prevents lateral displacement of said fixed jaw and said movable jaw, a fixed jaw and a movable jaw mounted in said body member, a set screw mounted in said body member for engagement with said movable jaw for retaining said movable jaw in fixed adjusted relation to said fixed jaw, and each of said jaws having sockets therein conforming to the configuration of said test specimen to retain said test specimen in said body member so as to permit the circulation of air about said test specimen.

5. The combination, as in claim 4, wherein each socket in said jaws is provided with a pair of spaced parallel convex projections forming a throat therebetween.

6. The combination, as in claim 5, wherein said test specimen is provided with concave shoulders to engage the convex projections in each of said jaws.

References Cited in the file of this patent
UNITED STATES PATENTS
2,185,340   Howe _____ Jan. 2, 1940
OTHER REFERENCES American Society for Testing Materials Standard D–651, adopted 1948. See, e.g., ASTM Standards 1961, Part II, p. 1128. Patent Office Scientific Library TA 401 A5 St.